(12) United States Patent
Rosenwinkel et al.

(10) Patent No.: US 8,776,694 B2
(45) Date of Patent: Jul. 15, 2014

(54) MONORAIL SORTATION SYSTEM

(75) Inventors: David Rosenwinkel, New Braunfels, TX (US); Charles Edward Pantusa, San Antonio, TX (US); Robert Austin, Swansboro, NC (US)

(73) Assignee: Cross Belt IP, LLC, New Braunfels, TX (US)

( * ) Notice: Subject to any disclaimer, the term of this patent is extended or adjusted under 35 U.S.C. 154(b) by 71 days.

(21) Appl. No.: 13/356,541

(22) Filed: Jan. 23, 2012

(65) Prior Publication Data

US 2013/0019773 A1     Jan. 24, 2013

Related U.S. Application Data

(63) Continuation-in-part of application No. 12/502,643, filed on Jul. 14, 2009, now Pat. No. 8,100,058, which is a continuation of application No. 10/531,322, filed as application No. PCT/US03/32703 on Oct. 16, 2003, now Pat. No. 7,559,282.

(60) Provisional application No. 60/418,795, filed on Oct. 16, 2002.

(51) Int. Cl.
*B61J 3/00*     (2006.01)

(52) U.S. Cl.
USPC ..................................... 104/88.02

(58) Field of Classification Search
CPC ........... B61B 3/00; B61B 13/04; B60S 13/02; B61J 1/10; B61J 1/12; B61J 3/00
USPC .......... 104/48, 89, 91, 93, 96, 118, 119, 121, 104/88.01–88.04; 105/141, 144, 148, 150
See application file for complete search history.

(56) References Cited

U.S. PATENT DOCUMENTS

| | | | |
|---|---|---|---|
| 4,671,183 A | 6/1987 | Fujita et al. |
| 4,763,771 A | 8/1988 | Geerts |
| 5,293,308 A | 3/1994 | Boys et al. |
| 5,433,311 A | 7/1995 | Bonnet |
| 5,445,080 A | 8/1995 | Austin |
| 5,676,061 A | 10/1997 | Loomer |
| 5,901,830 A | 5/1999 | Kalm et al. |

(Continued)

FOREIGN PATENT DOCUMENTS

| | | |
|---|---|---|
| DE | 39 10 542 | 8/1990 |
| EP | 1 153 860 | 11/2000 |

(Continued)

OTHER PUBLICATIONS

Supplementary European Search Report for PCT/US03/32703.

*Primary Examiner* — R. J. McCarry, Jr.
(74) *Attorney, Agent, or Firm* — Hahn Loeser & Parks LLP

(57) ABSTRACT

A sortation system where control and operation is facilitated by a contact-free, wireless communication configuration. Wireless communication is accomplished in a line-of-sight (LOS) manner while the cars of the sortation system are continuously moving along the track at operational speed. Each car is configured to operate independently with respect to how a car is instructed to accept and deliver packages. The sortation system provides for the cars to act as messengers between the bin stations and the system controller with respect to the status and health of the bin stations.

19 Claims, 14 Drawing Sheets

(56) References Cited

U.S. PATENT DOCUMENTS

| | | |
|---|---|---|
| 5,927,657 A | 7/1999 | Takasan et al. |
| 6,193,074 B1 | 2/2001 | Baum et al. |
| 6,231,293 B1 | 5/2001 | Ostholt et al. |
| 6,253,910 B1 | 7/2001 | Axmann |
| 6,273,268 B1 | 8/2001 | Axmann |
| 6,360,673 B1 | 3/2002 | Herrin et al. |
| 6,371,032 B1 | 4/2002 | Graefer et al. |
| 6,459,061 B1 | 10/2002 | Kugle et al. |
| 6,602,038 B2 | 8/2003 | Ahn et al. |
| 6,655,297 B2 | 12/2003 | Kawato et al. |
| 6,669,001 B1 | 12/2003 | Bromley et al. |
| 6,762,382 B1 * | 7/2004 | Danelski ................. 209/583 |
| 7,357,317 B2 | 4/2008 | Baldassari et al. |

FOREIGN PATENT DOCUMENTS

| | | |
|---|---|---|
| GB | 595 599 | 12/1947 |
| WO | 95/18757 | 7/1995 |
| WO | 97/09258 | 3/1997 |

* cited by examiner

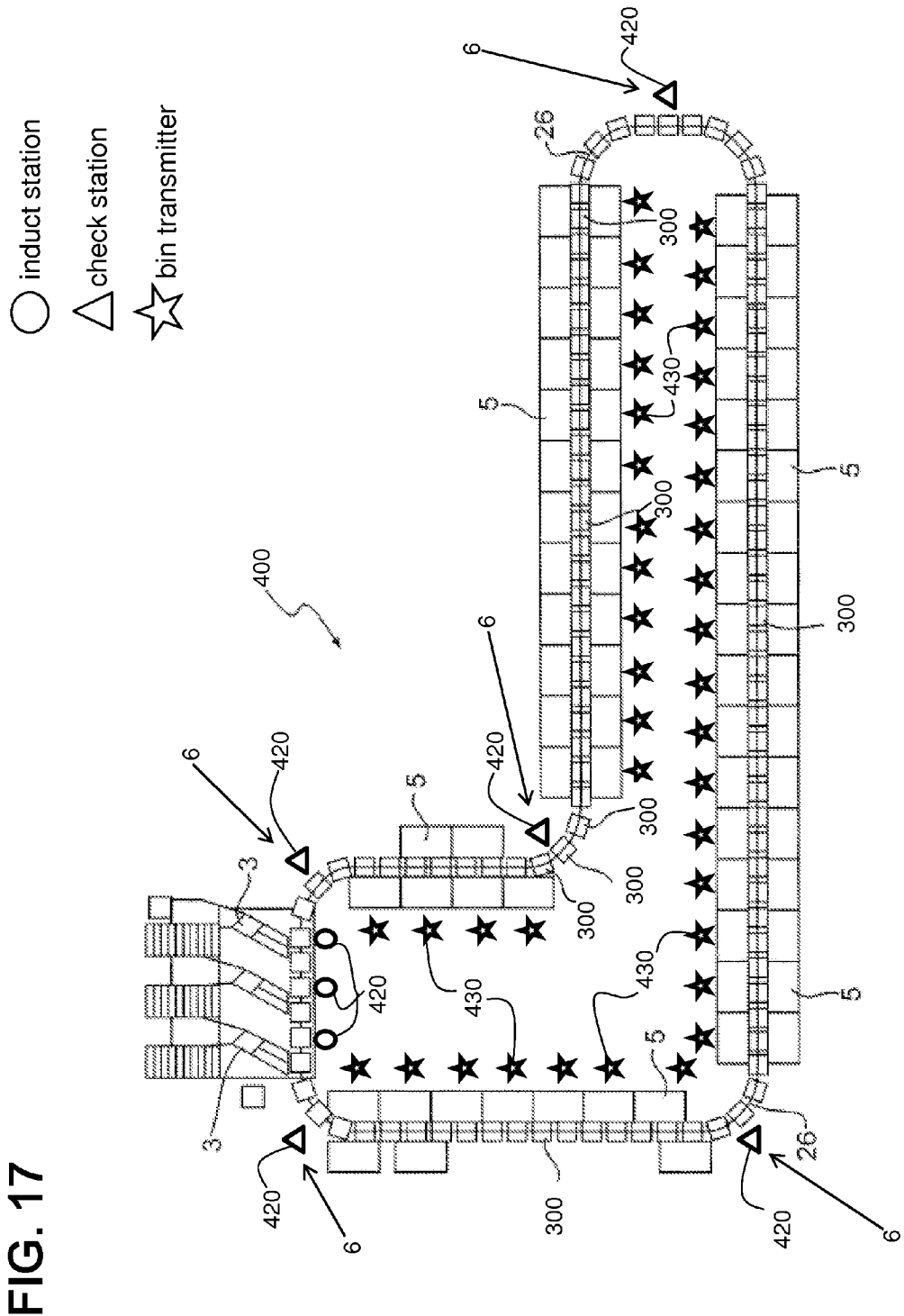

FIG. 18

| ASCII Command Sent to Car | ASCII Response from Car |
|---|---|
| ZYXXX | BAAA |
| PQXXX | PQXXX |

From check station or induct station:
XXX: Bin ID
Y: Destination Bin Location
    0 = Left
    1 = Right
Z: Car functions
    0 = None
    1 = Run car conveyor at induct station

From Bin Station:
XXX: Bin ID
P: Bin Status
    0 = left and right bins are clear
    1 = left bin is full
    2 = right bin is full
    3 = both left and right bins are full
Q: Health Status
    0 = left and right photo-eyes functioning normally
    1 = left photo-eye has a fault
    2 = right photo-eye has a fault
    3 = both left and right photo-eyes have faults

To check station or induct station
AAA: Car ID
B: Car Status
    0 = Car is empty
    1 = Car has been loaded with a package and has been sent a destination bin
    2 = Car has delivered package to destination bin
    3 = Car did not deliver package due to a "Bin Full" signal from the destination Bin Transmitter
    4 = error or problem with car
XXX: Bin ID
P: Bin Status
    0 = left and right bins are clear
    1 = left bin is full
    2 = right bin is full
    3 = both left and right bins are full
Q: Health Status
    0 = left and right photo-eyes functioning normally
    1 = left photo-eye has a fault
    2 = right photo-eye has a fault
    3 = both left and right photo-eyes have faults

MONORAIL SORTATION SYSTEM

This U.S. patent application is a continuation-in-part of U.S. patent application Ser. No. 12/502,643, filed on Jul. 14, 2009, which is a continuation of U.S. patent application Ser. No. 10/531,322, filed Apr. 12, 2005, now U.S. Pat. No. 7,559,282, which was the national stage entry of PCT/US03/32703, filed Oct. 16, 2003, which claimed priority from provisional application Ser. No. 60/418,795, filed Oct. 16, 2002, the disclosures of which applications are hereby incorporated by reference.

BACKGROUND

This invention relates generally to sortation systems and more particularly to monorail sortation systems.

Automated material handling and sortation systems are known for receiving, transporting and discharging goods among various stations in large scale sortation operations, for example warehousing, distribution, postal sortation and handling of mail and packages, and airport baggage handling, to name a few. Whatever the operation, goods typically originate from one location within the facility and must be sorted and transported to several different locations for further handling, or originate from several locations within a facility and must be transported to a single location such as a shipping dock. The manner in which the goods are sorted and selectively distributed among various stations in a facility of course depends on the nature of the operation.

One known sortation and delivery method involves using powered belt or roller conveyers to transport individual items or sorted loads of items to various destinations within a facility. When goods from multiple sources must be delivered to a single station, associated take away conveyors must be merged onto a main conveyor or discharge point. This requires careful coordination of each item as it arrives to prevent jams or damage. Each merge point on such a conveyor system would accordingly require a complex system of sensors, start/stop controls, actuators, power supply lines, etc. Similarly, when items must be delivered to multiple destinations or stations in a facility, a main conveyor must be provided with diverter apparatus to direct individual items or batches of items to either continue or be diverted at various points. Each diverter apparatus would require an additional closed system including sensors, actuators, control mechanisms, wiring and power supply to accomplish the diverting operation and track and identify the items being diverted.

The disadvantages of conveyor-type systems have led to the development of tracked systems. In one known type of system, a closed loop track carries cars propelled by a continuous belt or chain drive. The cars are equipped with open trays which can be loaded from chutes, and subsequently tilted to unload their carloads into bins which are located around the track. These cars are often termed "dumb" because they do not initiate any sorting actions, but rather respond to stimuli from the induction stations to discharge their load. For example, car speed is controlled by a track-side motor which circulates the belt or train drive, and car dumping is controlled by track-side dumping mechanisms. Such systems are designed for long term installations which sort and transport large volumes of goods. Although these closed loop track systems are an improvement over conveyor-type systems, the complexity of their track, drive and tilting mechanisms makes it a major undertaking to set them up or rearrange their sortation layout. They must be shut down for nearly all maintenance tasks.

The foregoing illustrates limitations known to exist in present sortation systems. Thus, it is apparent that it would be advantageous to provide an alternative directed to overcoming one or more of the limitations set forth above. Accordingly, a suitable alternative is provided including features more fully disclosed hereinafter.

SUMMARY

In one embodiment, a communication method in a sortation system having article-conveying cars moving along a track is provided. The method includes wirelessly transmitting bin status information from a first off-car communication device in communication with a bin station of the sortation system to an article-conveying car of the sortation system when the car is proximate to the bin station. The method also includes wirelessly relaying the bin status information from the car to a second off-car communication device in communication with a system controller of the sortation system when the car is proximate to an induct station or a check station of the sortation system. The method further includes sending the bin status information from the second off-car communication device to the system controller of the sortation system.

The method may further include wirelessly transmitting health status information of the bin station from the first off-car communication device to the car when the car is proximate to the bin station, wirelessly relaying the health status information from the car to the second off-car communication device when the car is proximate to the induct station or the check station, and sending the health status information from the second off-car communication device to the system controller. Alternately or additionally, the method may include wirelessly transmitting bin ID information of the bin station from the first off-car communication device to the car when the car is proximate to the bin station. The health status information may include one or more of a photo-eye functioning normally status and a photo-eye fault status. The bin status information may include one or more of a bin full status and a bin empty status.

The method may further include wirelessly transmitting one or more of car ID information of the car and bin ID information of the bin station from the car to the second off-car communication device when the car is proximate to the induct station or the check station. Alternatively or additionally, the method may include wirelessly transmitting car status information of the car from the car to the second off-car communication device when the car is proximate to the induct station or the check station, and sending the car status information from the second off-car communication device to the system controller. The car status information may include one or more of a car empty status, a car loaded status, a package delivered status, a bin full status, an error status, and a problem with car status.

The method may further include wirelessly transmitting bin destination information from the second off-car communication device to the car when the car is proximate to the induct station. The method may also include the second off-car communication device wirelessly transmitting clearing information to the car to overwrite information previously stored in the car when the car is proximate to the check station.

In one embodiment, a sortation system is provided. The sortation system includes a track forming a continuous loop, a plurality of article-conveying cars positioned on the track and configured to move along the track, a system controller, one or more communication stations positioned near the track for communicating with the cars and the system controller, and a plurality of bin stations positioned along the track for receiving packages from the cars. Each of the plurality of bin stations is configured to wirelessly transmit bin status information to a car when the car is proximate to a bin station. Each of the plurality of cars is configured to wirelessly relay the bin status information to an off-car communication device at one of the one or more communication stations when the car is proximate to one of the one or more communication stations. The off-car communication device is configured to send the bin status information to the system controller. In certain embodiments, the one or more communication stations may include one or more induct station for loading packages onto cars, one or more check stations for checking a status of a car, or some combination thereof.

Each of the plurality of bin stations may be configured to wirelessly transmit health status information of a bin station to a car when the car is proximate to the bin station. Each of the plurality of cars may be configured to wirelessly relay the bin health status information to an off-car communication device at one or the one or more communication stations when the car is proximate to one of the one or more communication stations. The off-car communication device may be configured to send the bin health status information to the system controller.

Each of the plurality of bin stations may be configured to wirelessly transmit bin ID information to a car when the car is proximate to a bin station. Each of the plurality of cars may be configured to wirelessly transmit one or more of car ID information and bin ID information to one of the one or more communication stations when the car is proximate to one of the one or more communication stations. Each of the plurality of cars may be configured to wirelessly transmit car status information to one of the one or more communication stations when a car is proximate to one of the one or more communication stations. Each of the one or more communication stations may be configured to send the car status information to the system controller.

A least one communication station of the one or more communication stations may be configured to wirelessly transmit bin destination information to a car of the plurality of cars when the car is proximate to the at least one communication station.

These and other novel features of the subject matter of the present application, as well as details of illustrated embodiments thereof, will be more fully understood from the following description and drawings.

BRIEF DESCRIPTION OF THE DRAWING FIGURES

FIG. 17 is a schematic illustration of a plan view of an exemplary embodiment of the alternative sortation system using a plurality of the article-conveying cars each having the electrical configuration of FIG. 15, and a plurality of the off-car communication devices of FIG. 16;

FIG. 18 is a table illustrating a portion of a communication scheme used in the sortation system of FIG. 17.

DETAILED DESCRIPTION

Figure 1:
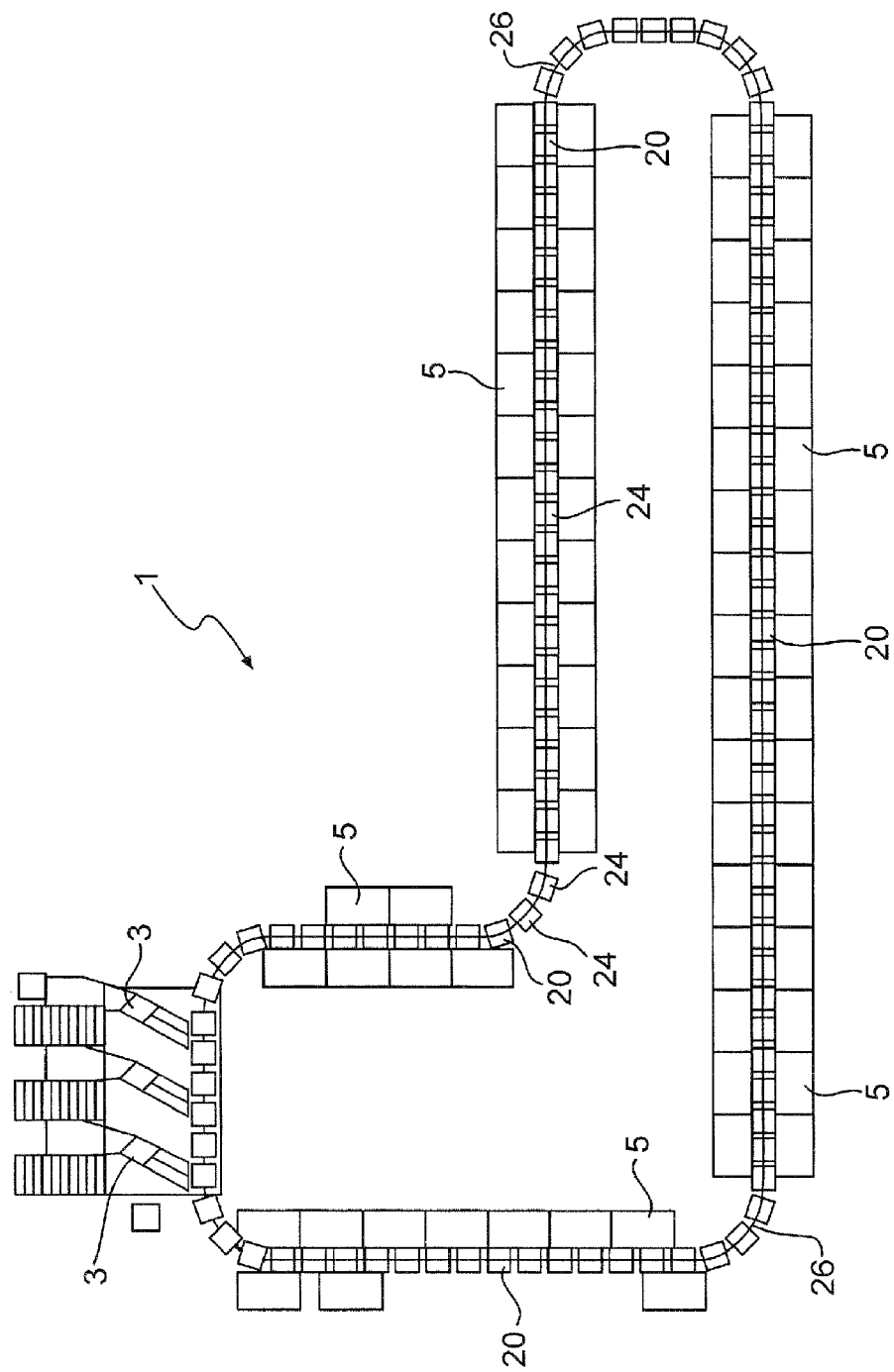
FIG. 1 is a plan view of a monorail sortation system according to the present invention.
Figure 2:
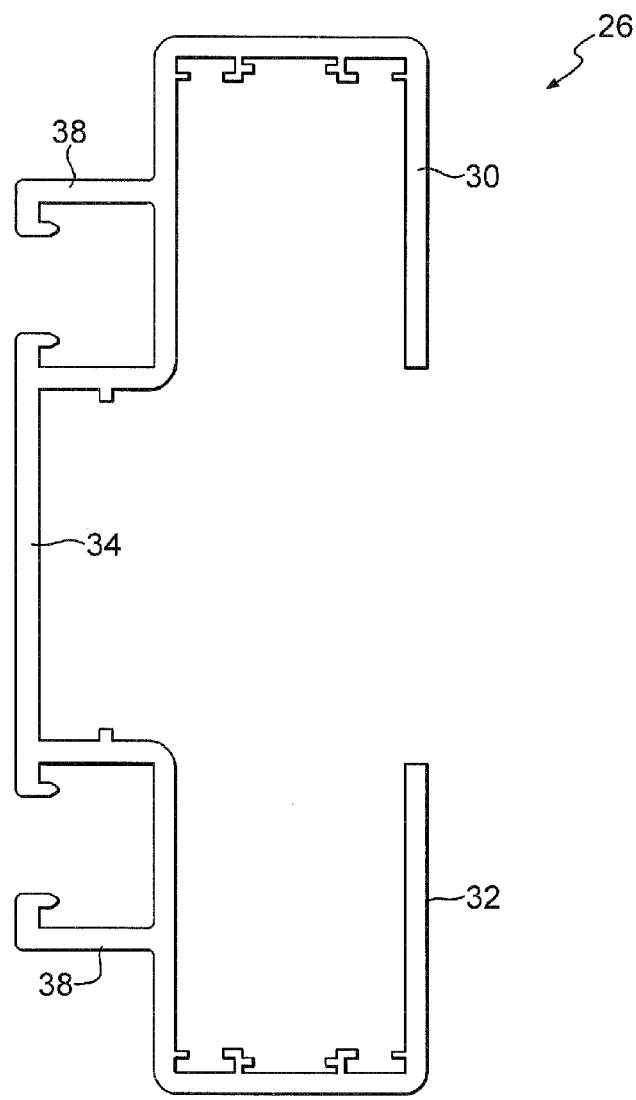
FIG. 2 is an end view of a monorail track for use with the sortation system shown in FIG. 1.
Figure 3:
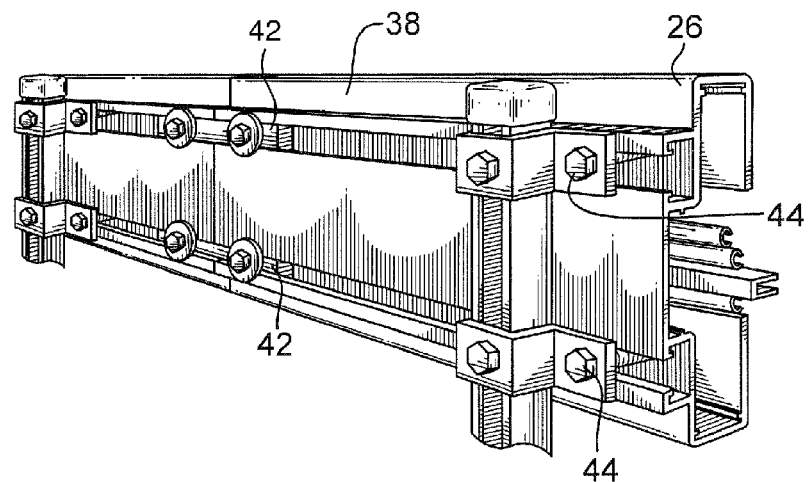
FIG. 3 is a perspective view of the monorail track shown in FIG. 2, illustrating the mounting flanges.
Figure 4:
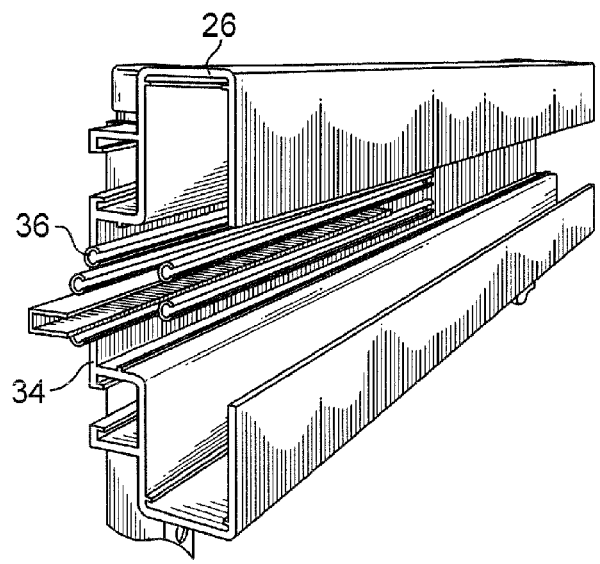
FIG. 4 is a second perspective view of the monorail track shown in FIG. 2, illustrating the power bus.
Figure 5:
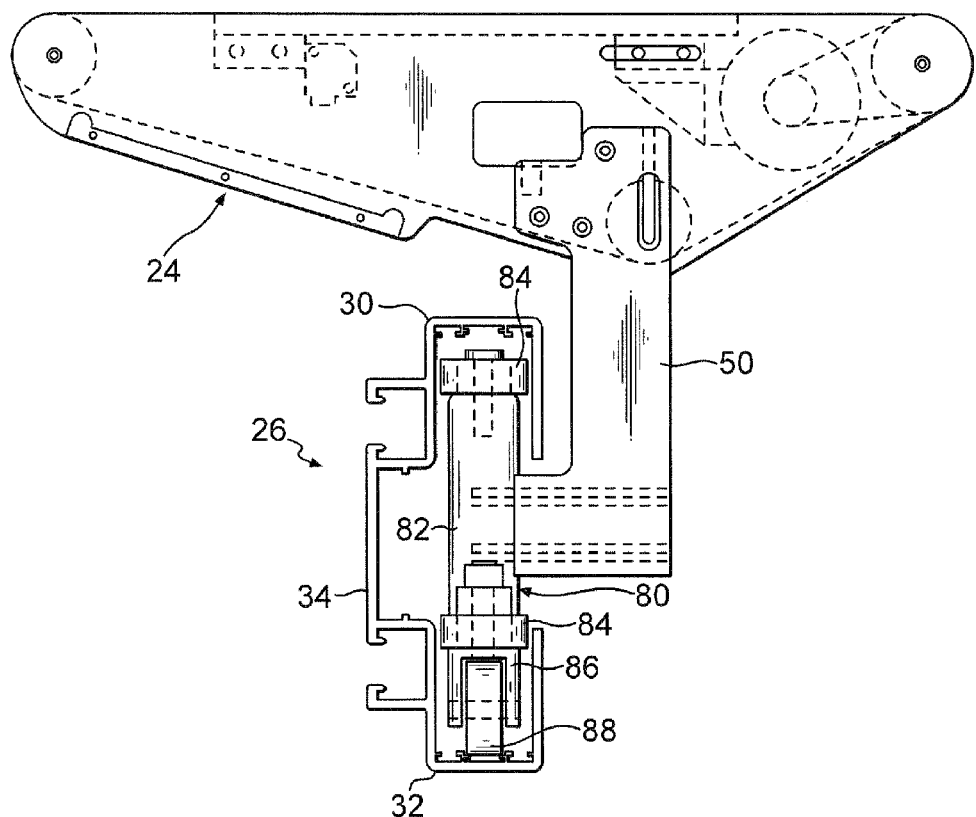
FIG. 5 is an end view of a section of the monorail track shown in FIG. 2, illustrating the engagement of a wheel assembly with the track.
Figure 6:
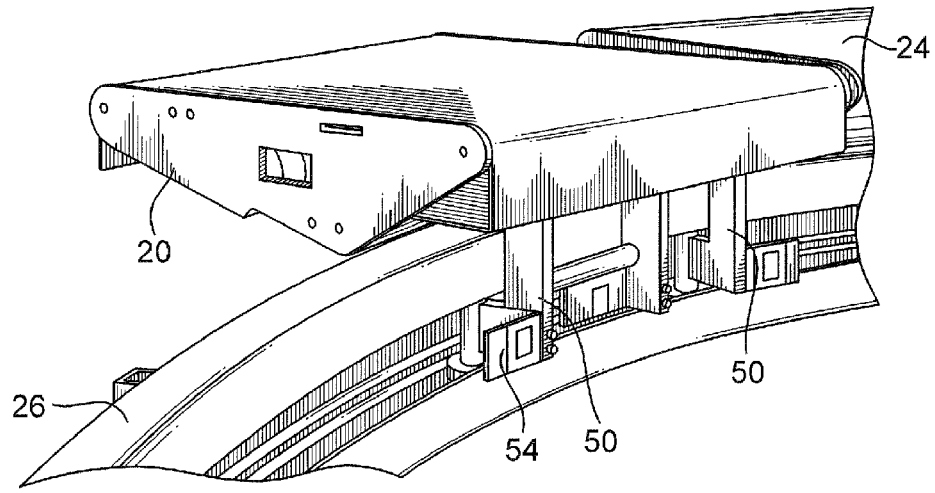
FIG. 6 is a perspective view of the tow car shown in FIG. 1.
Figure 7:
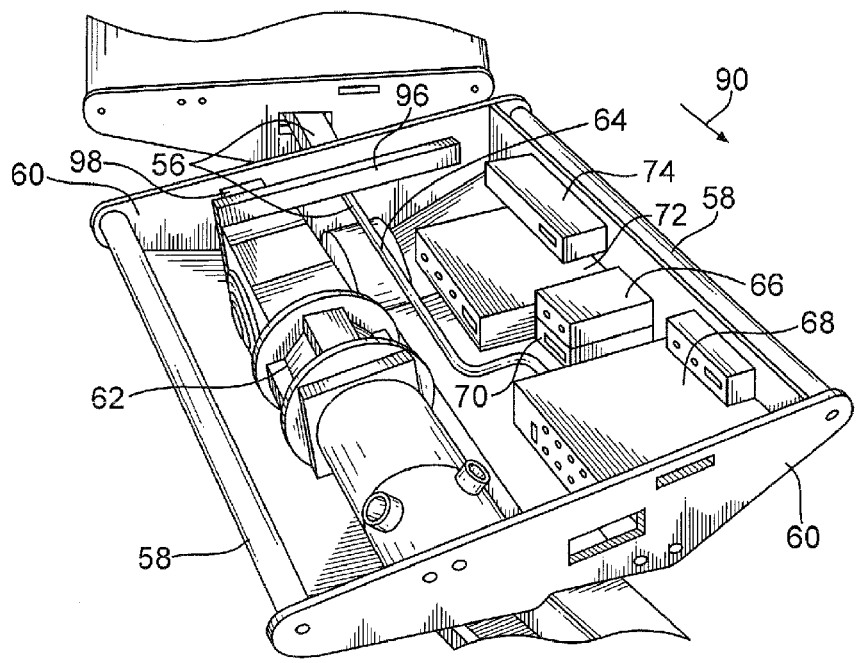
FIG. 7 is a perspective view of the tow car shown in FIG. 6, without a cover.
Figure 8:
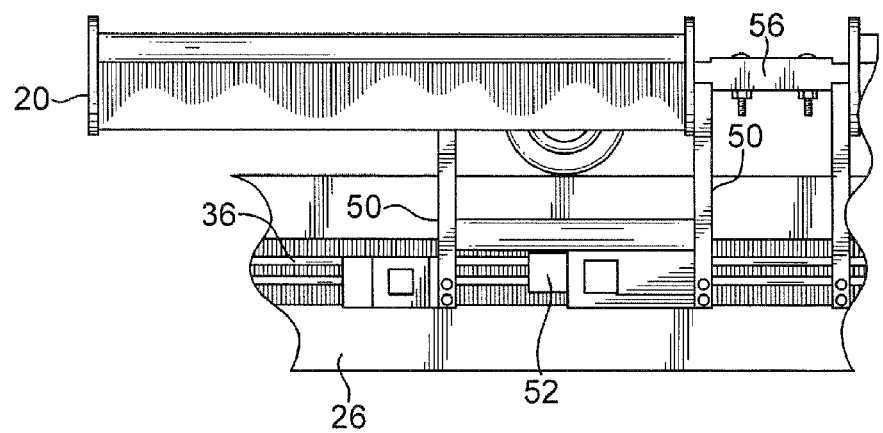
FIG. 8 is a side view of the tow car shown in FIG. 6.

FIG. 1 shows a sortation system 1 according to the present invention. In this sortation system 1, a continuous loop monorail track 26 supports a continuous train of interconnected tow or drive cars 20 and cross belt or article conveying cars 24. In one embodiment, a drive car 20 can pull about 24 article conveying cars. Although the drawings show a cross belt type car 24, other types of article conveying cars, such as a tilting car, can be used with the present invention. In addition to providing support for the cars 20, 24, the monorail track 26 also provides electrical power through a power bus 36 attached to the track 26 to the cars 20, 24. In the preferred embodiment, DC power at 80 volts for the drive motors and 24 volts for electronics is supplied through power bus 36. Preferably, a wireless communication system is used to provide control signals from a central control system to the cars 20, 24. Alternatively, a wired communication system could be included in the power bus 36.

Sortation system 1 includes multiple induction stations 3 where packages or articles are loaded onto article conveying cars 24. Multiple bins 5 accept the packages from the article conveying cars 24. When a package is loaded onto to an article conveying car 24, the control system is updated with information about the package, such as its destination, and associates that package with that particular article conveying car 24. As the article conveying car 24 approaches the appropriate bin 5 for that package, the control system signals the article conveying car 24 to unload the package into the appropriate bin 5. Alternatively, the control system informs the article conveying car 24 of the location of the appropriate bin. The article conveying car 24 keeps track of its location relative to the appropriate bin 5 and unloads the package into the appropriate bin.

Although there are many ways for the sortation system 1 to track the article conveying cars 24 relative to the appropriate bin 5, one method used for the present sortation system uses photo sensors (not shown) on the article conveying cars 24. When a package is loaded onto an article conveying car 24, the control system tells the car 24 to unload the package XX flags from the loading station 3. Placed about the system 1 are flags that are sensed by the photo sensors. For example, a package going to Minneapolis is loaded onto car 24. The bin 5 for Minneapolis packages is positioned 27 flags from the loading station 3. The article conveying car photo sensor senses the car 24 passing the flags. As the car 24 approaches the 27th flag, a controller on the article conveying car 24 operates an unloading mechanism or belt 100 to unload the package into the Minneapolis bin. ID tags, preferably bar codes, 54 are provided on each car 20, 24. A bar code sensor is used by the control system to determine which car 24 is being loaded with what package so that the appropriate destination commands can be sent to the right article conveying car 24.

FIGS. 2 through 5 show the features of monorail track 26 and the engagement of cars 20, 24 with track 26. Preferably track 26 is formed from multiple sections of either straight or curved monolithic extruded track. Track 26 is preferably an aluminum alloy. Track 26 includes an upper section 30 attached to a power section 34 that has a lower section 32 attached to it. Above and below the power section 34 are two longitudinally extending mounting flanges 38. A power bus 36, such as power conductors supplied by Vahle Electrification Inc. is mounted in power section 34. Each car 20, 24 includes a removable brush assembly 52 that slidably engages the power bus 36 so that power can be transferred to the cars 20, 24.

Mounting flanges 38 have two purposes. First, the flanges 38 are used to attach the track 26 to building structures, such as floors, walls or ceilings. Mounting brackets 44 are used to secure track 26 to whatever additional framework is needed to attach the track 26 to the appropriate structure. The second purpose of mounting flanges 38 is to secure one section of track 26 to an adjacent section of track 26 (See FIG. 3). Where two sections of track 26 are joined, jointers 42 are placed in the mounting flanges 38 of the two sections of track 26. The jointers 42 extend between the two sections of track 26 and are secured with fasteners or other mounting hardware.

Figure 9:
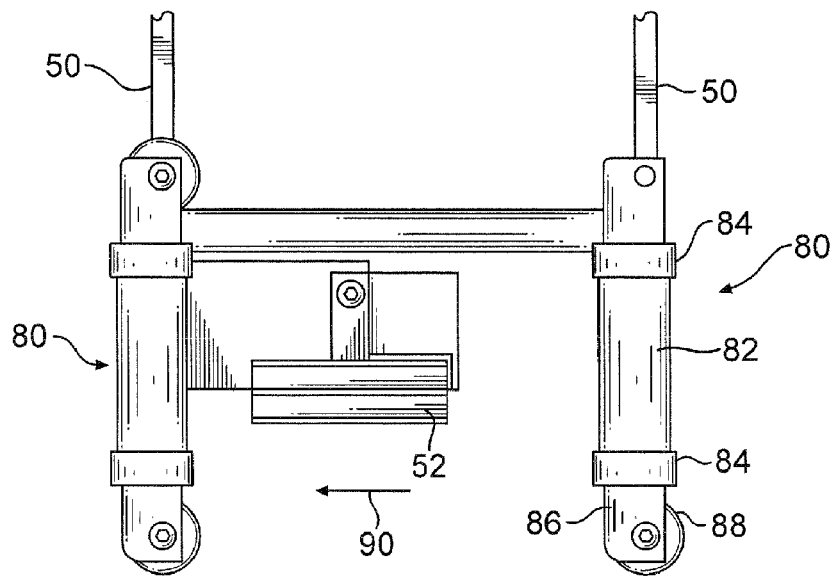
FIG. 9 is a side view of the lower portion of the tow car shown in FIG. 6.
Figure 10:
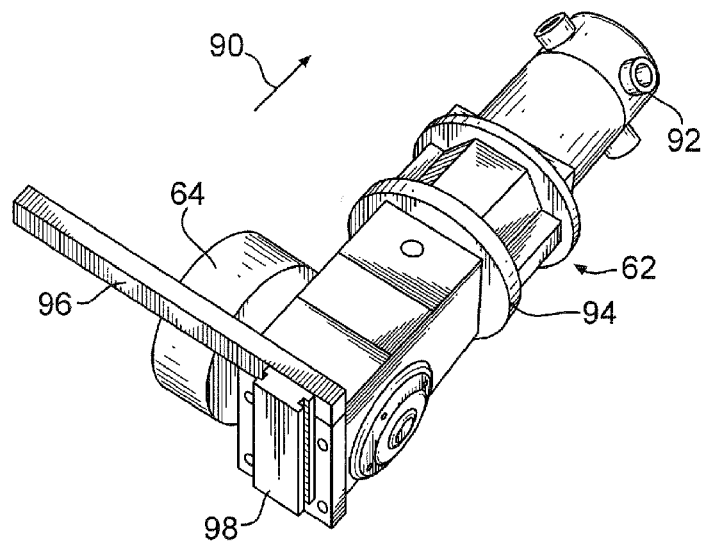
FIG. 10 is a perspective view showing the details of the motor and drive wheel assembly.
Figure 11:
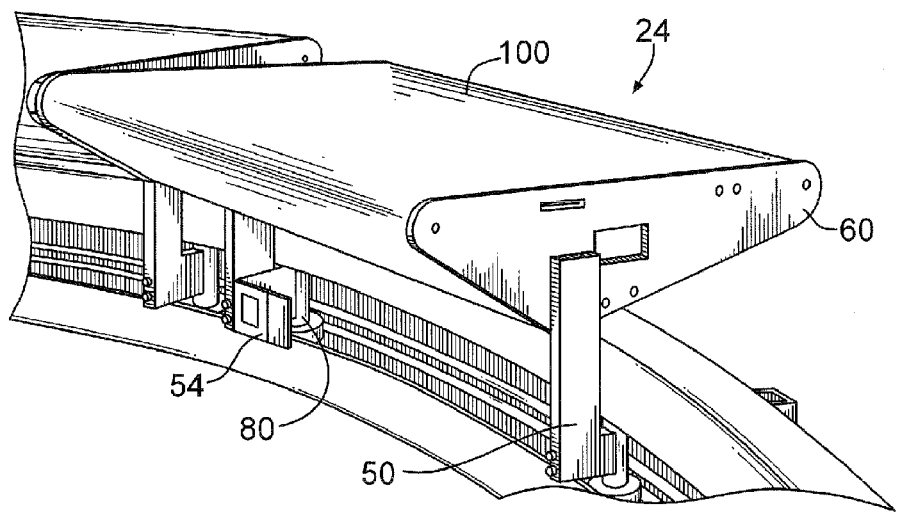
FIG. 11 is a perspective view of the cross belt car shown in FIG. 1.
Figure 12:
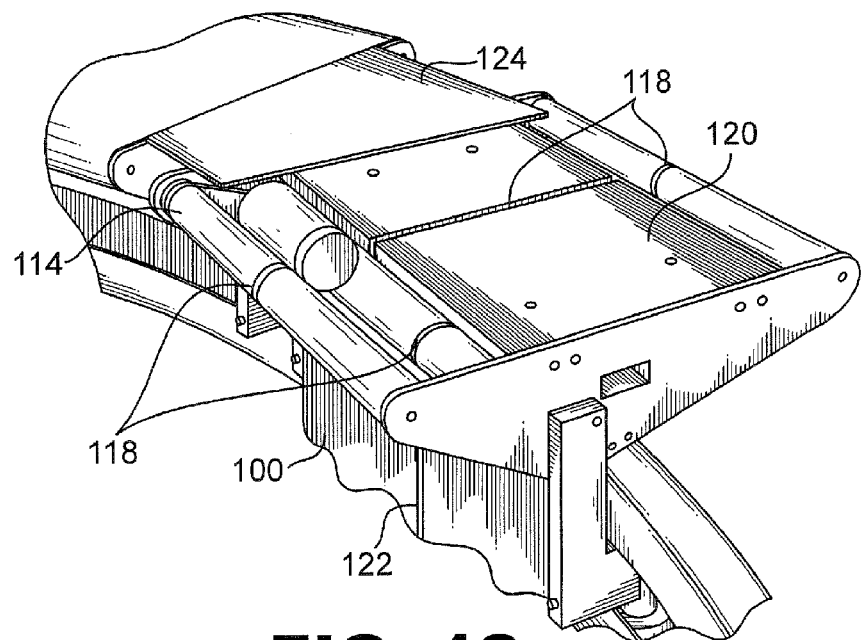
FIG. 12 is a perspective view of the cross belt car shown in FIG. 11, with the cross belt removed.
Figure 13:
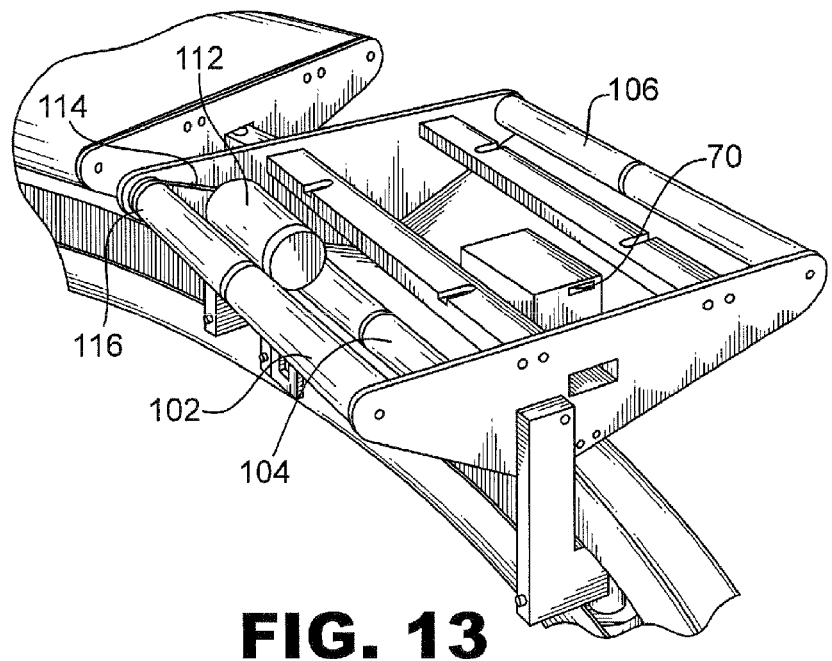
FIG. 13 is second perspective view of the cross belt car shown in FIG. 11, with certain components removed.
Figure 14:
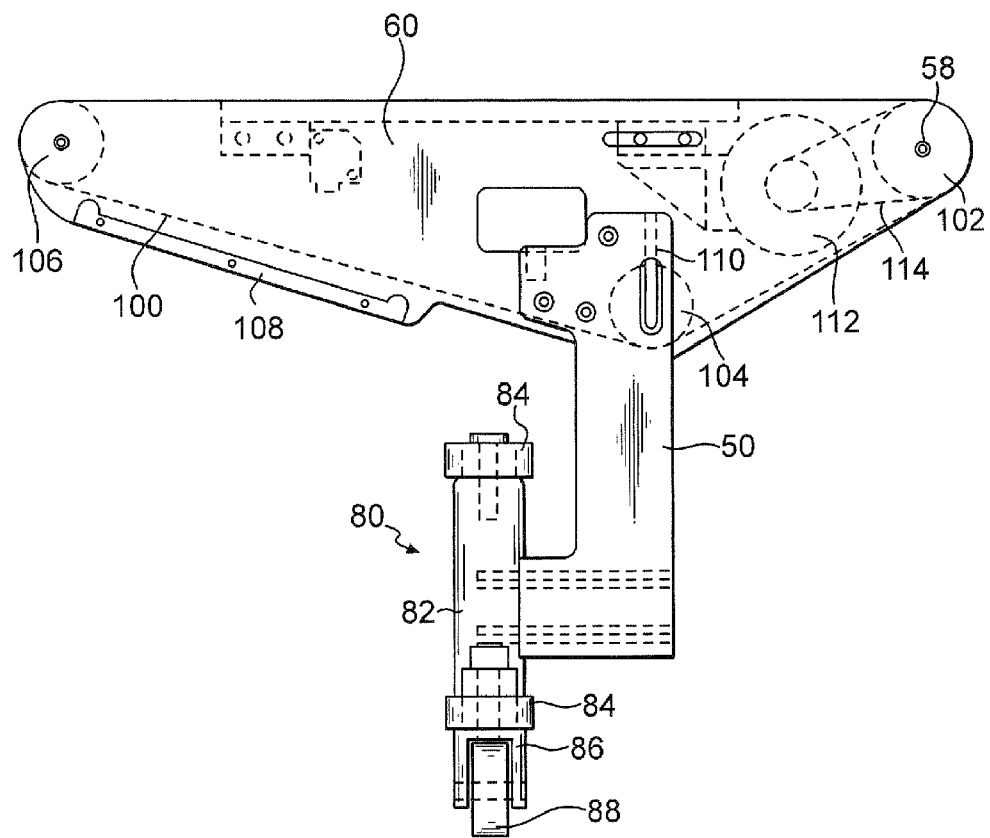
FIG. 14 is an end view of the cross belt car shown in FIG. 11.

Both types of cars 20, 24 use similar wheel assemblies 80 to attach the cars 20, 24 to the track 26. Each wheel assembly 80 consists of a center member 82 that is removably attached to a wheel assembly support 50. Wheel assembly support 50 is then attached to car 20, 24. Rotatable side wheels 84 are attached to the ends of center member 82. Side wheels 84 roll against the sides of track upper and lower sections 30, 32. End wheel(s) 88 are attached to either end, or both ends, of center member 82. Preferably, end wheel 88 uses a caster mount 86 that allows end wheel 88 to swivel as car 20, 24 moves through a section of curved track. Preferably, each car 20, 24 uses two wheel assemblies 80. In one embodiment, both end wheels 88 on an article conveying car 24 are at the lower end of the wheel assemblies 80. In another embodiment of a drive car 20 (see FIG. 9), one end wheel 88 is at the lower end of one wheel assembly 80 and one end wheel 88 is at the upper end of the other wheel assembly 80. The forward wheel assembly (relative to the direction of travel as shown by arrow 90) has the end wheel 88 at the upper end of wheel assembly 80. The forward wheel assembly 80 can optionally have a second end wheel 88 at its lower end, as shown in FIG. 9.

FIGS. 6 through 10 shows the details of drive car 20. Drive car 20 includes a frame formed from two side plates 60 and two cross bars 58. The article conveying car 24 uses a similar frame. A motor and drive wheel assembly 62 is attached to the rear of drive car 20. The motor and drive wheel assembly consists of a DC servo or positionable controllable motor 92 connected to a friction drive wheel 64 through a reducer and right angle drive 94. Drive wheel 64 engages the upper surface of track 26. Motor and drive wheel assembly 62 is suspended from the rear of car 20 by a cantilever arm 96 and a slide assembly 98. Cantilever arm 96 is attached to the reducer and right angle drive 94. The free end of cantilever arm 96 is attached to the frame of car 20. Slide assembly 98 consists of a slide on the reducer and right angle drive 94 that fits within, and slides within, a corresponding slotted block attached to the frame of car 20. This attachment arrangement for the motor and drive wheel assembly 62 suspends all the weight of the motor and drive wheel assembly 62 from the rear of car 20, allows the motor and drive wheel assembly 62 to move vertically, and thereby increases the downward force on drive wheel 64. Having all the weight at the rear of car 20 causes car 20 to tip up slightly in the front, see FIG. 8. Therefore, the forward wheel assembly 80 has the end wheel 88 at the upper end of the wheel assembly so that the end wheel 88 can ride against the inside top surface of the upper section of track 26.

Drive car 20 includes a wireless control signal receiver or modem 66 for receiving control signals from the central control system. The modem 66 can also be used for sending status information and error messages regarding the sortation systems cars back to the central control system. Modem 66 is connected to a computer 68 that in turn is connected to a DC servo controller 70. Depending upon the modem 66 and the DC servo controller 70 being used, modem 66 could be directly connected to the DC servo controller 70 thereby eliminating the computer 68. Car 20 includes a DC/AC inverter 72 that takes power from the power bus 36 via brush assembly 52 to supply AC power to any electronic components requiring AC power. A power supply 74 is provided to provide appropriate power to computer 68.

In operation, the central control system uses RF signals to broadcast control signals to drive cars 20 and to article conveying cars 24. Wireless modem 66 receives the control signals for both drive cars 20 and article conveying cars 24 and passes them to the computer 68, which then passes the control signals to the DC servo controller 70. DC servo controller 70 has two functions. First, it uses the control signals to send the appropriate control signals to DC servo motor 92 to move car 20. Second, it passes the control signals for the article conveying cars 24 through interconnection 56 to the other cars. Drive car 20 and article conveying car 24 use a CAN (Controller Area Network) serial bus network for inter-car communication. Interconnection 56 includes both a physical connection (see FIG. 8) and an electrical connection (see FIG. 7). Depending upon the characteristics of the controller 70 and the computer 68, the location where these functions are performed could change.

For a continuous sortation system, as shown in FIG. 1, the control of the multiple drive cars 20 has to be coordinated to evenly drive the continuous system. In one embodiment, the central control system sends commands to a lead drive car and the lead drive car coordinates the operation of the other drive cars. Alternatively, the central control system can coordinate the operation of all the drive cars and send individual commands to each drive car.

FIGS. 11 through 14 show the details of the article conveying car 24. Car 24 includes a frame formed from side plates 60 connected by two cross bars 58, similar to the frame for a drive car 20. Rotatable rollers 102, 106 are mounted on the cross bars 58. One roller 102 is a drive roller. The other roller 106 is preferably non-driven. A third roller 104 is positioned below rollers 102, 106 such that the three rollers form a triangle. Roller 104 is vertically movable and can be adjusted by threaded adjuster 110. A belt 100 is placed about the three rollers 102, 104, 106. Roller 104 is then adjusted to achieve the desired tension on belt 100. Belt 100 is preferably formed from a UHMW (Ultra High Molecular Weight) polymer, preferably a reduced friction polymer. A reduced friction UHMW polymer plate 120 is placed below the upper horizontal extent of belt 100. Plate 120 provides support for belt 100 when a package has been placed on car 24. Belt 100 includes a rib 122 extending below the belt. Rib 122 is essentially co-extensive with the length of belt 100. Corresponding grooves 118 are formed in the three rollers, 102, 104, 106 and plate 120. Tracking of the belt 100 is maintained by rib 122 tracking in grooves 118. This eliminates the need for side plates 60 to extend above belt 100 to maintain proper tracking of belt 100. It also eliminates the need for any roller adjustment mechanisms to adjust the tracking of belt 100. Without raised sides extending above belt 100, a large or long package can span two article conveying cars 24.

Car 24 includes a bi-directional DC servo motor 112 that is connected to drive roller 102 by drive belt 114. Preferably, both DC servo motor 112 and drive roller 102 include drive sprockets 116 and drive belt 114 is a grooved or ribbed timing belt. In one embodiment, roller drive sprocket 116 is cut into the end of roller 102. Car 24 includes a DC servo controller similar to the DC servo controller 70 for drive car 20. The DC servo controller receives commands from the central control system through interconnection 56 via a drive car 20 and any article conveying cars 24 between the DC servo controller and the drive car 20. In one embodiment, car 24 includes a photo sensor (not shown) that counts flags (not shown) to determine the position of car 24. When the designated number of flags have been counted, the DC servo controller operates DC servo motor 112 to move belt 100 causing a package to be moved from car 24 into a bin 5. When a large or long package has been placed on two adjacent article conveying cars 24, the DC servo controller for the lead or forward car operates its belt 100 first causing the package to turn towards bin 5. Next, belt 100 on the following car is operated ejecting the turned package into bin 5. Where bin 5 is large enough to accept a long package without it being turned first, belts 100 on both cars 24 are operated together to eject the long package into bin 5.

An intercar plate 124 is attached to the leading edge of car 24. Plate 124 extends across the gap between adjacent cars 24 and under the belt 100 on the leading car 24 (See FIG. 12). Plate 124 generally has a rectangular shape. In the preferred embodiment, plate 124 is formed of Lexan® polycarbonate resin.

In an alternate embodiment of sortation system 1, the drive cars 20 and article conveying cars 24 are combined into combination drive and article conveying cars. Preferably, this is accomplished by using a linear induction motor.

Linear electric motors belong to a special group of electrical machines that convert electrical energy directly to mechanical energy in translational motion. While all electric motors operate based on principles of electromagnetic interactions, there are different types of motors. Polyphase synchronous motors and induction motors both use alternating current as input electricity source. Direct current motors are normally used for small horsepower applications. Conceptually, any rotary motor has a linear counterpart. There are linear synchronous motors (with permanent magnet or wound field), linear induction motors, and linear direct current motors.

A linear electric motor is perhaps best understood by imagining the stator of an ordinary electrical motor being cut, unrolled and stretched lengthwise. An appropriate conductive material like copper, aluminum, or other material is positioned next to the unrolled stator. The alternating current in the unrolled stator provided by conventional techniques magnetically interacts with the conductive material to create a moving field of magnetic force acting on both the stator and the conductive material. The vehicle may be slowed down or stopped by reversing the polarity of that moving field.

A linear induction motor (LIM) consists of a primary and a secondary. When powered by three-phase alternating current, a moving flux is produced in the primary winding. Current induced in the secondary reacts with the flux, producing a mechanical force. Both the primary and the secondary of LIMs are flat structures. The interaction of flux and current moves the secondary linearly. A linear synchronous motor (LSM) has a similar structure, except that its secondary must be either a permanent magnet or a wound field with a direct current. The word "synchronous" comes from the fact that the primary magnetic field and the secondary magnetic field in a LSM move at the same speed.

A mount 108 is provided in side plates 60 to mount a reaction plate (aluminum and mild steel plates sandwiched together) bolts to each car 24. Linear motors bolt to the track parallel to the reaction plate with a small air gap. An AC drive powers the linear motor coils to propel the article conveying cars 24.

In accordance with an embodiment of the present invention, an alternative sortation system is provided having a plurality of cars (e.g., 50 to 500 cars) forming a train, where all of the cars are essentially the same and are article conveying cars (e.g., cross-belt sorting cars), and where the cars are driven along a track by a linear induction motor configuration. However, the cars may travel along the track in accordance with a variety of other methods as described herein. Control and operation of the alternative sortation system is facilitated by a contact-free, wireless infrared (IR) communication configuration as described below herein. Wireless communication is accomplished in a line-of-sight (LOS) manner while the cars are continuously moving along the track at operational speed (in one example, about 100 cars per minute past any given point on the track). Each car is configured to operate independently with respect to how a car is instructed to accept and deliver packages.

Figure 15:
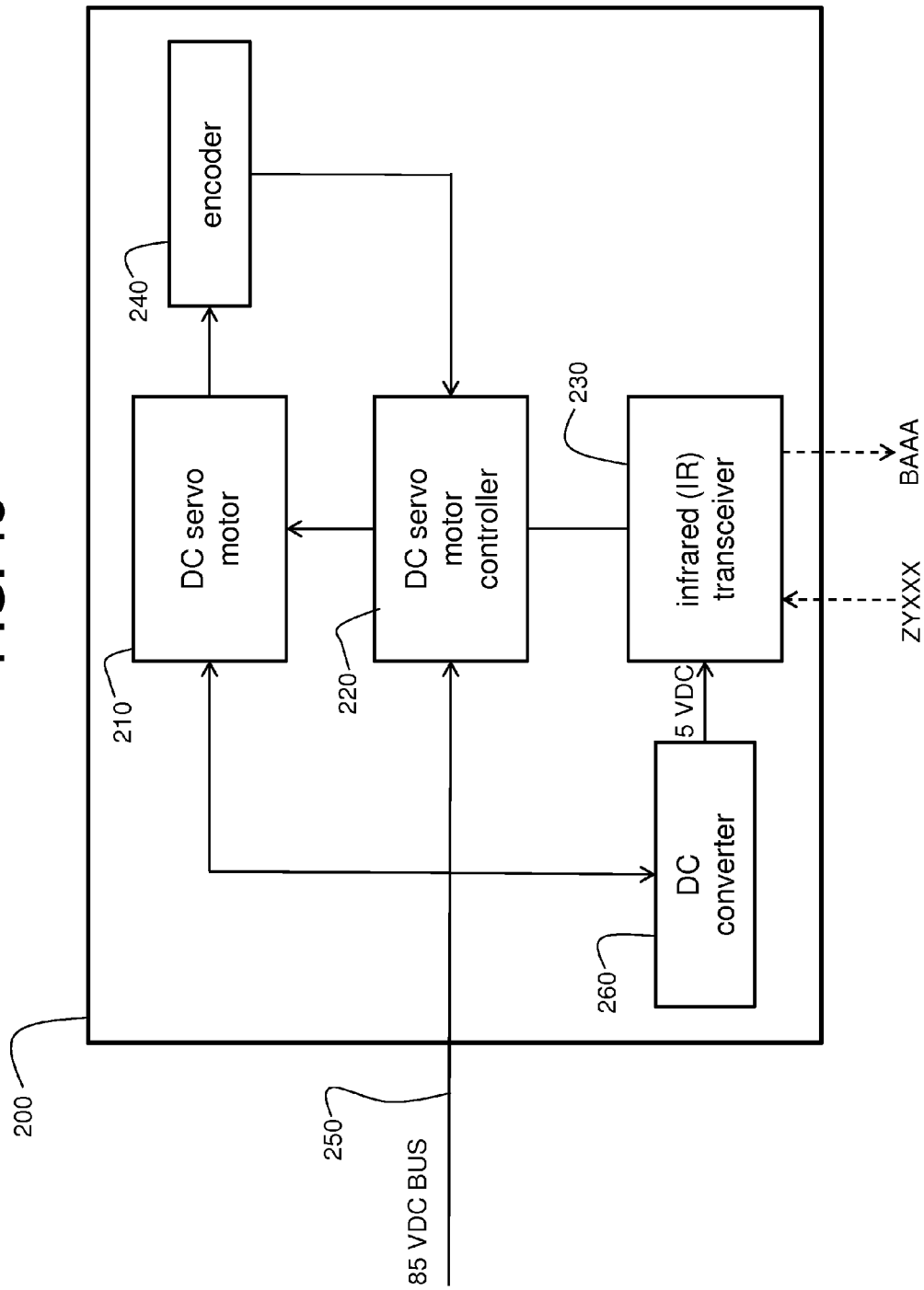
FIG. 15 illustrates a schematic block diagram of an exemplary alternative embodiment of an electrical configuration of an article-conveying car.

FIG. 15 illustrates a schematic block diagram of an exemplary alternative embodiment of an electrical configuration 200 of an article-conveying car. The configuration 200 includes a DC servo motor 210 for driving a package moving assembly of a car (e.g., of the cross-belt conveyor type previously described herein). The package moving assembly may be a package off-loading assembly for off-loading packages from the a car to a bin 5, or a combination package on-loading/off-loading assembly for loading packages onto a car at an induct station and for off-loading packages from the car to a bin 5. The term "bin" is used broadly herein and can be a bin, a chute, a bag, a conveyor, a roller table, or any other element capable of receiving a package from a car. The term "bin station" refers more generally to a "bin" along with other possible elements such as, for example, one or more of an associated off-car IR communication device, photo-eyes, and indicator lights as described in more detail later herein. The terms "bin" and "bin station" may sometimes be used interchangeably herein. The configuration 200 also includes a DC servo motor controller 220 operatively connected to the motor 210 and configured (e.g., programmed) to control the motor 210 to perform a package off-loading operation and/or a package on-loading operation.

The configuration 200, for each article conveying car, further includes a infrared (IR) transceiver 230 operatively connected to the controller 220 and configured to communicate with the controller 220. The IR transceiver 230 translates electrical signals to infrared signals and vice versa. Information may be electrically passed from the controller 220 to the IR transceiver 230, and from the IR transceiver 230 to the controller 220 as described later herein. The IR transceiver 230 is also configured to communicate wirelessly with off-car IR communication devices positioned along a track of a sortation system (via infrared signals). The IR transceiver 230 communicates with an off-car IR communication device via line-of-sight communication when proximate to (e.g., within four inches to twelve inches) an off-car IR communication device and can wirelessly transmit information to and receive information from an off-car IR communication device, as described in detail later herein. In accordance with an embodiment, communication between the transceiver 230 and the controller 220, and between the transceiver 230 and an off-car IR communication device is in accordance with the Recommended Standard 232 (RS-232) communication standard. Other communication standards are possible as well, in accordance with various other embodiments of the present invention. Furthermore, in accordance with an embodiment, the transceiver 230 may be mounted on an underside of each car to facilitate communication with off-car IR communication devices positioned below the cars along the track. In other embodiments, the transceiver 230 may be mounted on a lateral side of each car to facilitate communication with off-car IR communication devices positioned along a side of the track.

The configuration 200 includes an encoder 240 for monitoring the motor 210 by providing feedback information from the motor 210 to the controller 220. The encoder 240 is operatively connected between the motor 210 and the controller 220 to aid the controller 220 in controlling speed and position of, for example, a conveyor belt of the package moving assembly of the car 200. In accordance with an embodiment, the controller 220 drives the motor 210 to run for a certain time and distance for driving the package moving assembly to on-load or off-load a package. The encoder 240 is connected to a shaft of the motor 210 and turns as the shaft of the motor 210 rotates. In response to the turning (motor on), the encoder 240 produces electrical pulses that are sent to the controller 220. The controller 220 monitors and interprets the pulses to determine a speed of the motor 210 and/or a distance of travel of a corresponding element (e.g., a conveyor belt) of a package moving assembly. For example, 10,000 pulses may correspond to ten inches of travel of the conveyor belt of the package moving assembly. The controller uses the determined speed and distance information to adapt its control of the motor 210 to drive the package moving assembly as desired.

In accordance with an embodiment, electrical power is provided to the elements of the configuration 200 via an 85 volt DC bus 250. Some elements (e.g., the motor 210 and the controller 220) are powered directly by the 85 volts provided by the bus 250. A DC converter 260 is also provided which converts 85 volt DC power to 5 volt DC power which is used to power the IR transceiver 230, in accordance with an embodiment. An 85 VDC power supply (not shown) providing the 85 volts electrical power may be installed on one car and electrical power provided to a plurality of other cars via the bus 250, for example. In such a scenario, the cars are connected together and the bus 250 is routed to all of the cars. The 85 VDC power supply can be, for example, a battery or a bank of batteries, or can be a power converter that extracts AC power from the track and converts the AC power to DC power, in accordance with various embodiments.

Figure 16:
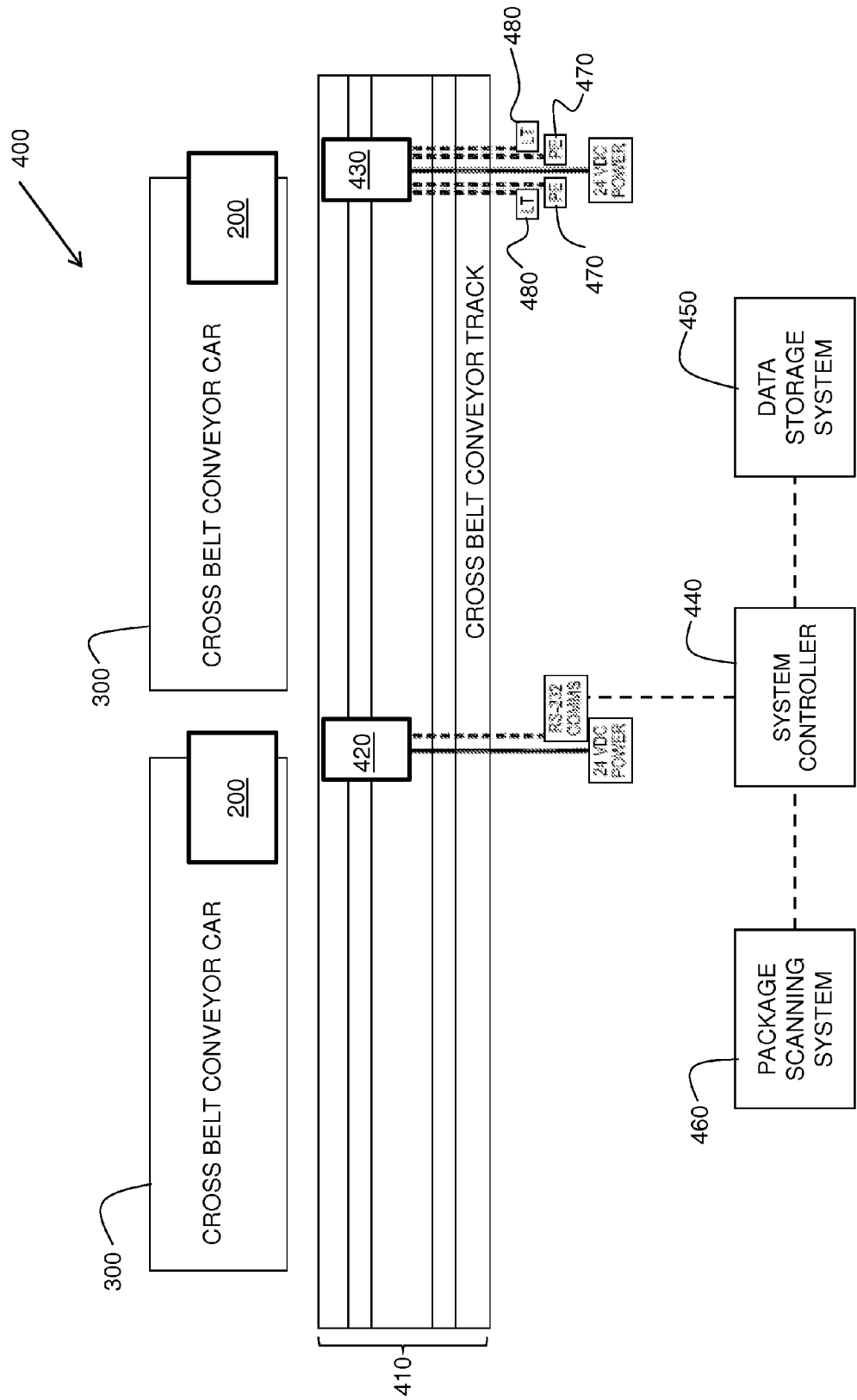
FIG. 16 is a schematic illustration of a portion of an exemplary alternative embodiment of a sortation system using a plurality of article-conveying cars having the electrical configuration of FIG. 15.

FIG. 16 is a schematic illustration of a portion of an exemplary alternative embodiment of a sortation system 400 using a plurality of article-conveying cars 300 having the electrical configuration 200 of FIG. 15. Two cars 300, each having the electrical configuration 200, are diagrammatically shown in FIG. 16, although any number of cars 300 may be provided as desired for the application. A portion of a cross-belt conveyor track 410, along which the cars 300 travel, is also shown. Again, the cars 300 may travel along the track 410 in accordance with a variety of methods as described herein.

In accordance with one embodiment, all of the cars 300 may be essentially the same and are physically linked together to form a continuous train. One or more of the cars 300 includes an 85 VDC power supply and electrical power is provided to the other cars 300 via the 85 VDC bus as described previously herein. The cars 300 may be driven along the track 410 in a linear induction manner. For example, the cars 300 are driven by linear induction motors (not shown) that are external to the cars 300 and are positioned along the track 410. A bottom portion of each car 300 includes a reaction plate (not shown) that is acted upon by the linear induction motors. The linear induction motors generate an electromagnetic field that acts on the reaction plates of the cars 300 and pushes the train of cars along the track 410. In such an embodiment, all of the cars 300 are article-conveying cars that are driven along the track 410 by the linear induction configuration, and no separate dedicated drive cars may be provided. Each car may be configured to carry a package and is capable of loading and/or unloading a package.

Referring to FIG. 16, an off-car IR communication device 420 is shown positioned along the track 410 (e.g., below the cars). A bin IR communication device 430 is also shown positioned along the track 410 (e.g., below the cars). In accordance with an embodiment of the present invention, the device 420 is an IR transceiver embedded on a printed circuit board (PCB) which is positioned at one or more induct stations, or at check stations, or at combinations thereof of the sortation system 400. The bin IR device 430 is an IR transmitter embedded on a PCB which is positioned at a bin station 5 of the sortation system 400. The functional communication that takes place between the IR communication device 420 and the car transceiver 230 at an induct station and at a check station is described in detail later herein. Also, the functional communication that takes place between the bin IR communication device 430 and the car transceiver 230 at a bin station 5 is also described in detail later herein. Both types of devices 420 and 430 are powered by 24 VDC electrical power provided along the track 410 by, for example one or more 24 VDC power supplies, in accordance with an embodiment.

The sortation system 400 also includes a system controller 440. The system controller 440 may be, for example, a server computer (e.g., programmed to run a controlling program) or a programmable logic controller (PLC), in accordance with various embodiments. Other types of system controllers are possible as well, in accordance with various other embodiments. The system controller 440 communicates with the off-car IR communication devices 420 in accordance with the Recommended Standard 232 (RS-232) communication standard.

The sortation system 400 further includes a data storage system 450 in operative communication with the system controller 440. In accordance with an embodiment, the data storage system 450 is configured to store searchable package-identifying information that is correlated to package destination information. The data storage system 450 may include, for example, a database or a look-up-table. Other types of data storage systems are possible as well, in accordance with various other embodiments.

The sortation system 400 also includes a package scanning system 460 in operative communication with the system controller 440. The package scanning system 460 is configured to scan package-identifying information (which may be, for example, in the form of a bar code or an RFID tag) from a package (e.g., at an induct station) and provide the package-identifying information to the system controller 440. The package scanning system 460 may include, for example, a bar code scanner or an RFID scanner and may be an off-line (manual scanning) type or an in-line (automatic scanning) type. Other types of scanning systems are possible as well, in accordance with various other embodiments.

In accordance with an embodiment, the system controller 440 is configured to search the data storage system 450 based on the package-identifying information to find corresponding package destination information. The package destination information (which may include a particular bin station) can be communicated from the system controller 440 to a car 300, as the car passes an induct station, via IR communication between the off-car IR communication device 420 and the IR transceiver 230 on a car 300.

FIG. 17 is a schematic illustration of a plan view of an exemplary embodiment of the alternative sortation system 400 using a plurality of the article-conveying cars 300 each having the electrical configuration 200 of FIG. 15, and a plurality of the off-car communication devices 420 and 430 of FIG. 16. The sortation system 400 also includes the system controller 440, the data storage system 450, and the package scanning system 460 which are shown in FIG. 16 but are not shown in FIG. 17.

The sortation system 400 of FIG. 17 has a track 26 that forms a continuous loop along which bin stations 5 are placed for off-loading packages at various pre-designated locations. In accordance with one embodiment, linear induction motors are positioned along the track to drive the cars 300 along the track. All of the cars 300 are the same and are article-conveying cars. In this example, there are no separate drive cars. The sortation system also includes loading or induct stations 3 as discussed above with reference to FIG. 1. Packages may be manually loaded onto the cars or may be automatically loaded onto the cars at the induct stations. In accordance with an embodiment, automatic loading is accomplished, in part, by operating a conveyor belt of the car.

Instead of using photo sensors to sense flags positioned along the track at the various bin stations 5 as discussed above, the sortation system 400 uses line-of-sight IR communication between the cars 300 and the off-car IR communication devices 430 positioned at the bin stations 5 to determine when a particular car 300 is at a particular bin station 5 along the track 26. Again, the term "bin" is used broadly herein and can be a bin, a chute, a bag, a conveyor, a roller table, or any other element capable of receiving a package from a car. The term "bin station" refers more generally to a "bin" along with one or more of an associated off-car IR communication device, photo-eyes, and indicator lights as described in more detail later herein. The off-car IR communication devices 430 are infrared bin transmitters that are schematically represented by the stars in FIG. 17.

Two photo-detectors or "photo-eyes" (PE) 470 (one for the left side of a bin and one for the right side of a bin) may be provided at each bin station 5 operatively connected to the IR bin transmitter 430 such as schematically shown in FIG. 16. The photo-eyes are configured to determine if the left side, the right side, or both sides of a bin are full, or not, and transmit an associated signal to the IR bin transmitter 430. In accordance with an embodiment, the photo-eyes are configured to detect that a bin is full when a beam of light is broken by a package in the bin. A bin station 5 may also have one or more indicator lights (LT) 480 (e.g., one light for the left side of the bin and one light for the right side of the bin) to provide a local indication to a human observer that the bin is full. For example, if a light 480 is red, then a corresponding side of the bin is full. If a light 480 is green, then a corresponding side of the bin is empty.

Off-car IR communication devices 420 are positioned at the induct stations 3, as represented by the circles in FIG. 17, and at check stations 6, as schematically represented by the triangles in FIG. 17. Again, the off-car IR communication devices 420 are IR transceivers that are operatively connected to the system controller 440. The particulars of communication between the cars 300 and the off-line IR communication devices 420 and 430 are described in detail herein below.

FIG. 18 is a table illustrating a portion of a communication scheme used in the sortation system 400 of FIG. 17. As the cars 300 travel around the track 26, the system controller 440 constantly checks the status of the cars 300 as the cars pass by an induct station and/or a check station 6. The off-car IR communication device 420 transmits a command to the IR transceiver 230 of a passing car 300, commanding the car to transmit status information to the communication device 420 at the induct station 3 or the check station 6. When the status of a car is requested at an induct station and/or a check station 6, the controller 220 of the car 300 responds by transmitting information, which may be in the form of characters in the American Standard Code for Information Interchange (ASCII) character encoding scheme via the Recommended Standard 232 (RS-232) communication standard, to the communication device 420 at the check station via line-of-sight IR communication.

In the example shown in FIG. 18, transmitted information includes a car ID, represented as three ASCII characters (AAA) which uniquely identifies the car 300 (e.g., by numbers 000-999), and the car status, represented as a single ASCII character (B). A "0" status character indicates that the car 300 is empty (is not currently carrying a package). A "1" status character indicates that the car 300 is loaded with a package and is on its way to a destination bin 5. A "2" status character indicates that the car has successfully delivered a package to the correct destination bin 5. A "3" status character indicates that the car did not successfully deliver a package due to a "bin full" indicator received from the IR bin transmitter 430 of the destination bin 5, indicating that the bin is full. A "4" status character indicates an error or a problem with the car 300 (e.g., a car motor controller fault).

Once the system controller 440 knows the current status of a car 300, the system controller 440 can direct the car at the check station to continue on its way under its current instructions, can clear the instructions from the controller of the car at the check station to prepare the car to receive new instructions at an induct station, or can provide the car with a new set of instructions at the check station (e.g., if an error occurred). In general, when instructions are written to a car at a check station or at an induct station, the instructions may be read back from the car to the IR transceiver 420 to verify that the instructions were written to the car correctly.

At an induct station 3, an empty car 300 can be loaded (manually or automatically) with a new package and provided with instructions from the system controller 440 for delivering the package. Referring to the example of FIG. 18, an IR transceiver 420 at an induct station 3 can transmit a bin ID of three ASCII characters (XXX) and a left/right character (Y) to a car 300 via line-of-sight IR communication between the IR transceiver 420 at the induct station 3 and the IR transceiver 230 on the car 300. The bin ID indicates to which bin station 5 the car is to deliver the package. The left/right character indicates in which direction (left or right) the package is to be off-loaded from the car at the bin station 5. A car function character (Z) may also be transmitted to the car where a "0" indicates no function and a "1" indicates that the car 300 is to run its motor 210 for driving the package moving assembly of the car to on-load a new package at the induct station. The instructions received by the IR transceiver 230 on the car are communicated to the motor controller 220 on the car and stored.

As a car 300, loaded with a package and destination instructions, travels along the track 26, the IR bin transmitters 430 at each bin station 5 transmits a unique three-character bin ID (XXX) which identifies the associated bin station 5. Each IR bin transmitter 430 can be configured with a unique bin ID by, for example, setting dial switches (e.g., each from 0-9) or DIP switches (e.g., each from 0-1) on a circuit board of the IR bin transmitter 430, in accordance with an embodiment. The transmitted bin ID is received by the IR transceiver 230 on the car 300 and is communicated to the motor controller 220.

The IR bin transmitter 430 also transmits a "bin status" character (P) to the car which is stored by the motor controller. A "0" bin status character indicates that both the left and right sides of the bins are clear (not full). A "1" bin status character indicates that the left side of the bin is full. A "2" bin status character indicates that the right side of the bin is full. A "3" bin status character indicates that both the left and right sides of the bin are full. As such, one or more photo-detectors or "photo-eyes" (PE) 470 at the bin station 5 are operatively connected to the IR bin transmitter 430 and are configured to determine if the bin is full, or not, and send an associated bin status signal (P) to the IR bin transmitter 430 which gets transmitted to the car. As discussed above, bin station 5 may also have one or more indicator lights (LT) 480 to provide a local indication to a human observer that the bin is full.

An IR bin transmitter 430 may also transmit a "health status" character (Q) to the car indicating the health of an associated bin station 5 which is stored by the motor controller. A "0" health status character indicates that the left and right photo-eyes 470 of the bin station 5 are functioning properly. A "1" health status character indicates that the left photo-eye has a fault. A "2" health status character indicates that the right photo-eye has a fault. A "3" health status character indicates that both the left and right photo-eyes have faults.

As a result, when a bin station 5 transmits its information (i.e., bin ID, bin status, and health status) to a car 300, the car 300 travels around the track and can report the stored bin information to the system controller 440 via an off-car IR communication device 420 at a check station 6 and/or an induct station 3. Therefore, the architecture and communication arrangement of the sortation system 400 provides for the cars 300 to act as messengers between the bin stations 5 and the system controller 440. In this way, each bin station 5 does not have hardware or wiring, for example, to communicate status directly back to the system controller 440. Instead, the cars 300 serve as an intermediary or messenger.

Upon receiving a bin ID from a bin transmitter, the motor controller 220 compares the received bin ID from the IR bin transmitter 430 to the destination bin ID stored in the motor controller 220. When a match occurs, the motor controller 220 checks the bin status and the health status and activates the motor 210 to unload the package to the matching bin station 5 according to the stored instructions, if the bin is not already full. If the bin station has indicated to the car 300 that the bin is full, the car does not unload the package and reports the "bin full" condition at the next check station 6 or induct station 3 as status information. In general, at a check station 6 or an induct station 3, the corresponding off-car IR communication device 420 may interrogate a car 300 for one or more of the car status (B), the bin status (P), and the health status (Q).

If a car reports a problem with a bin station 5 to the system controller 440, the system controller 440 can dispatch someone to check the bin station 5 to, for example, clear a package or fix a photo-eye. Alternatively, if a car reports a problem with a bin station 5, the system controller 440 can display a fault signal on a monitor or other display or activate a fault beacon. The system controller 440 can also re-direct the car that reported the problem to a different bin station, or to a generic or default bin station for packages that were not able to be successfully delivered. Furthermore, the system controller 440 can ensure that no other cars are directed to deliver a package to the problematic bin station 5 until the problem is fixed.

In accordance with a simpler embodiment, a bin station 5 may simply report a bin status by way of a "bin full" condition to a car 300, and the car 300 may relay the "bin full" status to an induct station 3 or a check station 6 with the car status (B) information (e.g., car status "3" . . . car did not deliver package due to a "bin full" signal from the destination bin). In this embodiment, the detailed bin status (P) and health status (Q) information may not be written to the car and relayed to an induct station or a check station. Such a simpler embodiment may be employed when the motor controller 220 does not have enough memory or storage for handling the detailed bin status (P) information and the health status (Q) information. In this embodiment, the system controller 440 receives the bin status with the car status (B) information (e.g., car status "3" . . . car did not deliver package due to a "bin full" signal from the destination bin), and in response, the system controller can dispatch someone to check the bin station 5, or display a fault signal on a monitor or other display, or activate a fault beacon.

Figure 19:
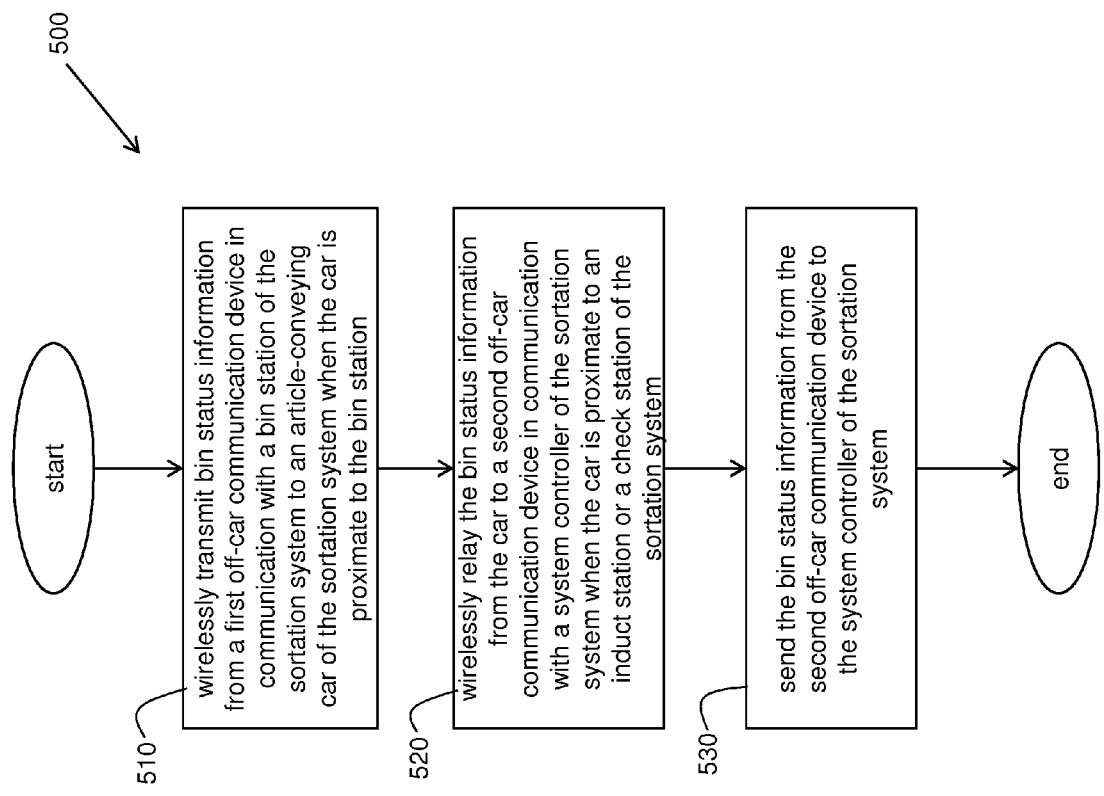
FIG. 19 illustrates an exemplary embodiment of a communication method in the sortation system of FIG. 17.

FIG. 19 illustrates an exemplary embodiment of a communication method 500 in the sortation system 400 of FIG. 17. In step 510, wirelessly transmit bin status information from a first off-car communication device in communication with a bin station of the sortation system to an article-conveying car of the sortation system when the car is proximate to the bin station. In step 520, wirelessly relay the bin status information from the car to a second off-car communication device in communication with a system controller of the sortation system when the car is proximate to an induct station or a check station of the sortation system. In step 530, send the bin status information from the second off-car communication device to the system controller of the sortation system. By employing the method 500, the cars 300 act as messengers between the bin stations 5 and the system controller 440. In this way, each bin station 5 does not have hardware or wiring, for example, for direct communication between the bin station 5 and the system controller 440. Instead, the cars 300 serve as an intermediary or messenger to communicate bin status to the system controller 440.

Therefore, in summary, as the cars 300 travel around the track 26, the status of the cars 300 and bin stations 5 are checked and the cars 300 are provided with instructions as how to proceed based, at least in part, on the reported status of the cars 300 and the bin stations 5. An empty car 300 may proceed to an induct station 3 to take on a new package and be provided with new instructions as to where to deliver the new package. Upon arriving at the correct destination location (i.e., a bin station), the motor controller 220 of the car 300 operates the motor 210 in accordance with the instructions to unload the package. All communication between cars, induct stations, and check stations occurs via line-of-sight IR communication.

While the claimed subject matter of the present application has been described with reference to certain embodiments, it will be understood by those skilled in the art that various changes may be made and equivalents may be substituted without departing from the scope of the claimed subject matter. In addition, many modifications may be made to adapt a particular situation or material to the teachings of the claimed subject matter without departing from its scope. Therefore, it is intended that the claimed subject matter not be limited to the particular embodiments disclosed, but that the claimed subject matter will include all embodiments falling within the scope of the appended claims.

What is claimed is:

1. A communication method in a sortation system having article-conveying cars moving along a track, said method comprising:
   wirelessly transmitting bin status information from a first off-car communication device in communication with a bin station of the sortation system to an article-conveying car of the sortation system when the car is proximate to the bin station;
   wirelessly relaying the bin status information from the car to a second off-car communication device in communication with a system controller of the sortation system when the car is proximate to an induct station or a check station of the sortation system; and
   sending the bin status information from the second off-car communication device to the system controller of the sortation system.

2. The method of claim 1, further comprising:
   wirelessly transmitting health status information of the bin station from the first off-car communication device to the car when the car is proximate to the bin station;
   wirelessly relaying the health status information from the car to the second off-car communication device when the car is proximate to the induct station or the check station; and
   sending the health status information from the second off-car communication device to the system controller.

3. The method of claim 2, wherein the health status information includes one or more of a photo-eye functioning normally status and a photo-eye fault status.

4. The method of claim 1, further comprising wirelessly transmitting bin ID information of the bin station from the first off-car communication device to the car when the car is proximate to the bin station.

5. The method of claim 1, further comprising wirelessly transmitting one or more of car ID information of the car and bin ID information of the bin station from the car to the second off-car communication device when the car is proximate to the induct station or the check station.

6. The method of claim 1, further comprising:
   wirelessly transmitting car status information of the car from the car to the second off-car communication device when the car is proximate to the induct station or the check station; and
   sending the car status information from the second off-car communication device to the system controller.

7. The method of claim 6, wherein the car status information includes one or more of a car empty status, a car loaded status, a package delivered status, a bin full status, an error status, and a problem with car status.

8. The method of claim 1, further comprising wirelessly transmitting bin destination information from the second off-car communication device to the car when the car is proximate to the induct station.

9. The method of claim 1, further comprising the second off-car communication device wirelessly transmitting clearing information to the car to overwrite information previously stored in the car when the car is proximate to the check station.

10. The method of claim 1, wherein the bin status information includes one or more of a bin full status and a bin empty status.

11. A sortation system, said sortation system comprising:
    a track forming a continuous loop;
    a plurality of article-conveying cars positioned on the track and configured to move along the track;
    a system controller;
    one or more communication stations positioned near the track for communicating with the cars and the system controller; and
    a plurality of bin stations positioned along the track for receiving packages from the cars,
    wherein each of the plurality of bin stations is configured to wirelessly transmit bin status information to a car when the car is proximate to a bin station, and
    wherein each of the plurality of cars is configured to wirelessly relay the bin status information to an off-car communication device at one of the one or more communication stations when the car is proximate to one of the one or more communication stations, and
    wherein the off-car communication device is configured to send the bin status information to the system controller.

12. The sortation system of claim 11, wherein
    each of the plurality of bin stations is configured to wirelessly transmit health status information of a bin station to a car when the car is proximate to the bin station, and
    wherein each of the plurality of cars is configured to wirelessly relay the bin health status information to an off-car communication device at one of the one or more communication stations when the car is proximate to one of the one or more communication stations, and
    wherein the off-car communication device is configured to send the bin health status information to the system controller.

13. The sortation system of claim 11, wherein the one or more communication stations includes one or more induct stations for loading packages onto the cars.

14. The sortation system of claim 11, wherein the one or more communication stations includes one or more check stations for checking a status of a car.

15. The sortation system of claim 11, wherein the one or more communication stations includes a combination of one or more induct stations and one or more check stations.

16. The sortation system of claim 11, wherein each of the plurality of bin stations is configured to wirelessly transmit bin ID information to a car when the car is proximate to a bin station.

17. The sortation system of claim 11, wherein each of the plurality of cars is configured to wirelessly transmit one or more of car ID information and bin ID information to one of the one or more communication stations when the car is proximate to one of the one or more communication stations.

18. The sortation system of claim 11, wherein
    each of the plurality of cars is configured to wirelessly transmit car status information to one of the one or more communication stations when a car is proximate to one of the one or more communication stations, and wherein each of the one or more communication stations is configured to send the car status information to the system controller.

19. The sortation system of claim 11, wherein at least one communication station of the one or more communication stations is configured to wirelessly transmit bin destination information to a car of the plurality of cars when the car is proximate to the at least one communication station.

* * * * *